United States Patent
Sodani et al.

(10) Patent No.: US 7,502,912 B2
(45) Date of Patent: Mar. 10, 2009

(54) METHOD AND APPARATUS FOR RESCHEDULING OPERATIONS IN A PROCESSOR

(75) Inventors: Avinash Sodani, Hillsboro, OR (US); Per H. Hammarlund, Hillsboro, OR (US); Stephan J. Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 10/749,272

(22) Filed: Dec. 30, 2003

(65) Prior Publication Data

US 2005/0149689 A1 Jul. 7, 2005

(51) Int. Cl.
*G06F 9/38* (2006.01)
(52) U.S. Cl. .................................... 712/214
(58) Field of Classification Search ................ 712/214, 712/215, 216, 217
See application file for complete search history.

(56) References Cited

U.S. PATENT DOCUMENTS

| | | | | |
|---|---|---|---|---|
| 6,035,389 A | * | 3/2000 | Grochowski et al. | 712/216 |
| 6,163,838 A | * | 12/2000 | Merchant et al. | 712/219 |
| 6,256,745 B1 | * | 7/2001 | Sager et al. | 713/501 |
| 6,877,086 B1 | * | 4/2005 | Boggs et al. | 712/218 |
| 6,912,648 B2 | * | 6/2005 | Hammarlund et al. | 712/219 |

* cited by examiner

*Primary Examiner*—Eric Coleman
(74) *Attorney, Agent, or Firm*—Kenyon & Kenyon LLP

(57) ABSTRACT

A method and apparatus for rescheduling operations in a processor. More particularly, the present invention relates to optimally using a scheduler resource in a processor by analyzing, predicting, and sorting the write order of instructions into the scheduler so that the duration the instructions sit idle in the scheduler is minimized. The analyses, prediction, and sorting may be done between an instruction queue and a scheduler by using delay units. The prediction can be based on history (latency, dependency, and resource) or on a general prediction scheme.

24 Claims, 5 Drawing Sheets

METHOD AND APPARATUS FOR RESCHEDULING OPERATIONS IN A PROCESSOR

BACKGROUND OF THE INVENTION

The primary function of most computer processors is to execute computer instructions. Most processors execute instructions in the programmed order that they are received. However, some recent processors, such as the Pentium®, II processor from Intel Corp., are "out-of-order" processors. An out-of-order processor can execute instructions in any order as the data and execution units required for each instruction becomes available. Therefore, with an out-of-order processor, execution units within the processor that otherwise may be idle can be more efficiently utilized.

With either type of processor, delays can occur when executing "dependent" instructions. A dependent instruction, in order to execute correctly, requires a value produced by another instruction that has executed correctly. For example, consider the following set of instructions:
1) Load memory-1 into register-X;
2) Add1 register-X register-Y into register-Z.
3) Add2 register-Y register-Z into register-W.

The first instruction loads the content of memory-1 into register-X. The second instruction adds the content of register-X to the content of register-Y and stores the result in register-Z. The third instruction adds the content of register-Y to the content of the register-Z and stores the result in register-W. In this set of instructions, instructions 2 and 3 are dependent instructions that are dependent on instruction 1 (instruction 3 is also dependent on instruction 2). In other words, if register-X is not loaded with the proper value in instruction 1 before instructions 2 and 3 are executed, instructions 2 and 3 will likely generate incorrect results. Dependent instructions can cause a delay in known processors because most known processors typically do not schedule a dependent instruction until they known that the instruction that the dependent instruction depends on will produce the correct result.

Referring now to the drawings, FIG. 1 is a block diagram of a processor pipeline and timing diagram illustrating the delay caused by dependent instructions in most known processors. In FIG. 1, a scheduler 105 schedules instructions. The instructions proceed through an execution unit pipeline that includes pipeline stages 110, 115, 120, 125, 130, 135 and 140. During each pipeline stage a processing step is executed. For example, at pipeline stage 110 the instruction is dispatched. At stage 115 the instruction is decoded and source registers are read. At stage 120 a memory address is generated (for a memory instruction) or an arithmetic logic unit ("ALU") operation is executed (for an arithmetic or logic instruction). At stage 125 cache data is read and a lookup of the translation lookaside buffer ("TLB") is performed. At stage 130 the cache Tag is read. At stage 135 a hit/miss signal is generated as a result of the Tag read. The hit/miss signal indicates whether the desired data was found in the cache (i.e., whether the data read from the cache at stage 125 was the correct data). As shown in FIG. 1, the hit/miss signal is typically generated after the data is read at stage 125, because generating the hit/miss signal requires the additional steps of TLB lookup and Tag read.

The timing diagram of FIG. 1 illustrates the pipeline flow of two instructions: a memory load instructions ("Ld") and an add instruction ("Add"). The memory load instruction is a six-cycle instruction, the add instruction is a one-cycle instruction, and the add instruction is dependent on the load instruction. At time=0 (i.e., the first clock cycle) Ld is scheduled and dispatched (pipeline stage 110). At time=1, time=2 and time=3, Ld moves to pipeline stages 115, 120 and 258, respectively. At time=4, Ld is at pipeline stage 130. At time=5, Ld is at stage 135 and the hit/miss signal is generated. Scheduler 105 receives this signal. Finally at time=6, assuming a hit signal is received indicating that the data was correct, scheduler 105 schedules. Add to stage 110, while Ld continues to stage 140, which is an additional pipeline stage. The add operation is eventually performed when Add is at stage 120. However, if a time=6 a miss signal is received, scheduler 105 will wait an indefinite number of clock cycles until data is received by accessing the next levels of the cache hierarchy.

As shown in the timing diagram of FIG. 1, Add, because it is dependent on Ld, cannot be scheduled until time=6, at the earliest. A latency of an instruction may be defined as the time from when its input operands must be ready for it to execute until its result is ready to be used by another instruction. Therefore, the latency of Ld in the example of FIG. 1 is six. Further, as shown in FIG. 1, scheduler 105 cannot schedule Add until it receives the hit/miss signal. Therefore, even if the time required to read data from a cache decreases with improved cache technology, the latency of Ld will remain at six because it is dependent on the hit/mass signal.

Reducing the latencies of instructions in a processor is sometimes necessary to increase the operating speed of a processor. For example, suppose that a part of a program contains a sequence of N instructions, $I_1, I_2, I_3 \ldots I_N$. Suppose that $I_{n+1}$ requires, as part of its inputs, the result of $I_n$, for all n, from 1 to N-1. This part of the program may also contain any other instructions. The program cannot be executed in less time than $T=L_1+L_2+L_2+\ldots+L_N$, where $L_n$ is the latency of instruction $I_n$, for all n from 1 to N. In fact, even if the processor was capable of executing a very large number of instructions in parallel, T remains a lower bound for the time to execute this part of this program. Hence to execute this program faster, it will ultimately be essential to shorten the latencies of the instructions.

Based on the foregoing, there is a need for a computer processor that can schedule instructions, especially dependent instructions, faster than known processors, and therefore reduces the latencies of the instructions.

DETAILED DESCRIPTION OF THE DRAWINGS

One embodiment of the present invention is a processor that speculatively schedules instructions and that includes a replay system. The replay system replays instructions that were not executed correctly when they were initially dispatched to an execution unit. Further, the replay system preserves the originally scheduled order of the instructions.

Figure 1:
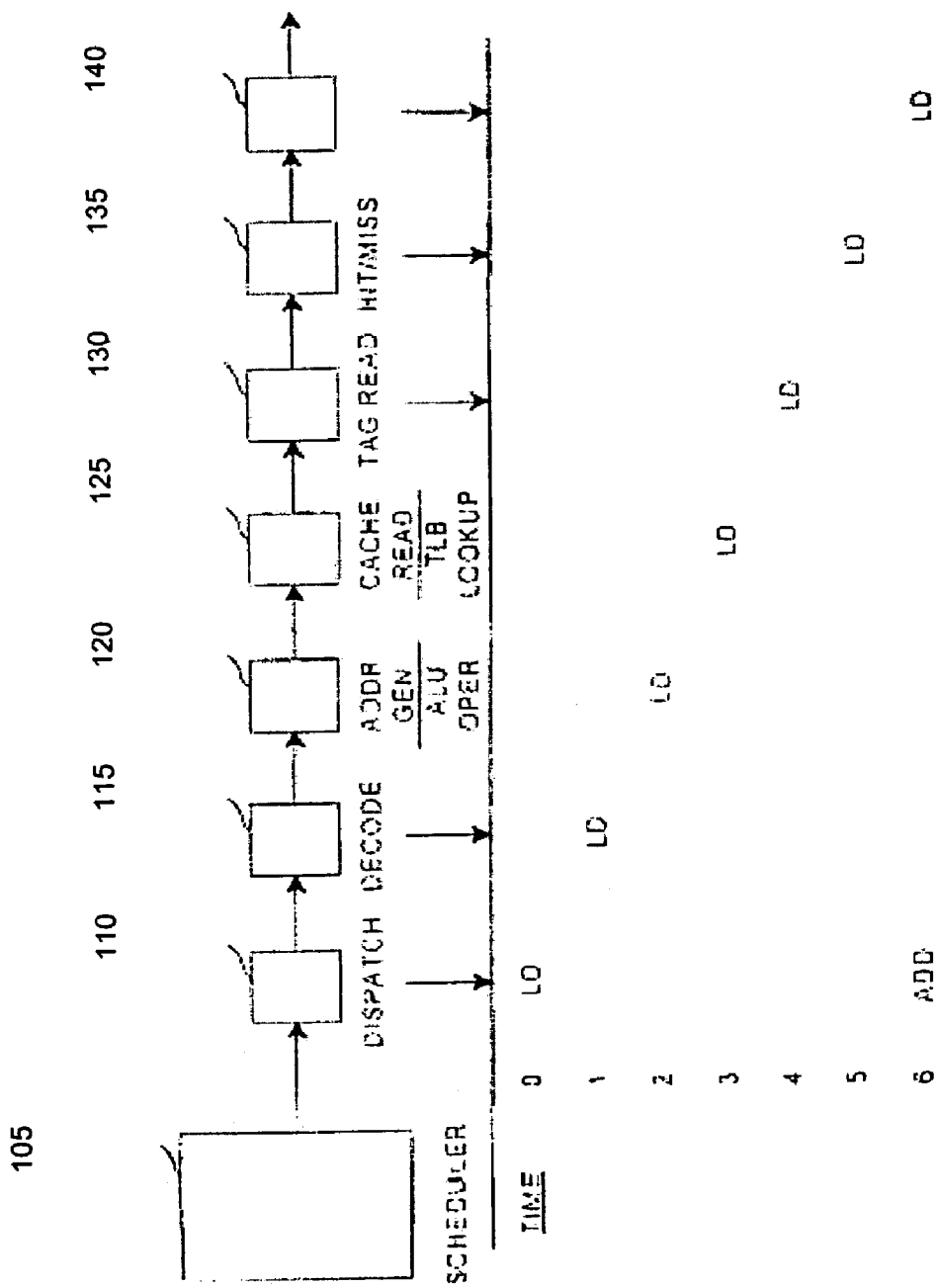
FIG. 1 is a block diagram of a prior art processor pipeline and timing diagram illustrating the delay caused by dependent instructions in most known processors.
Figure 2:
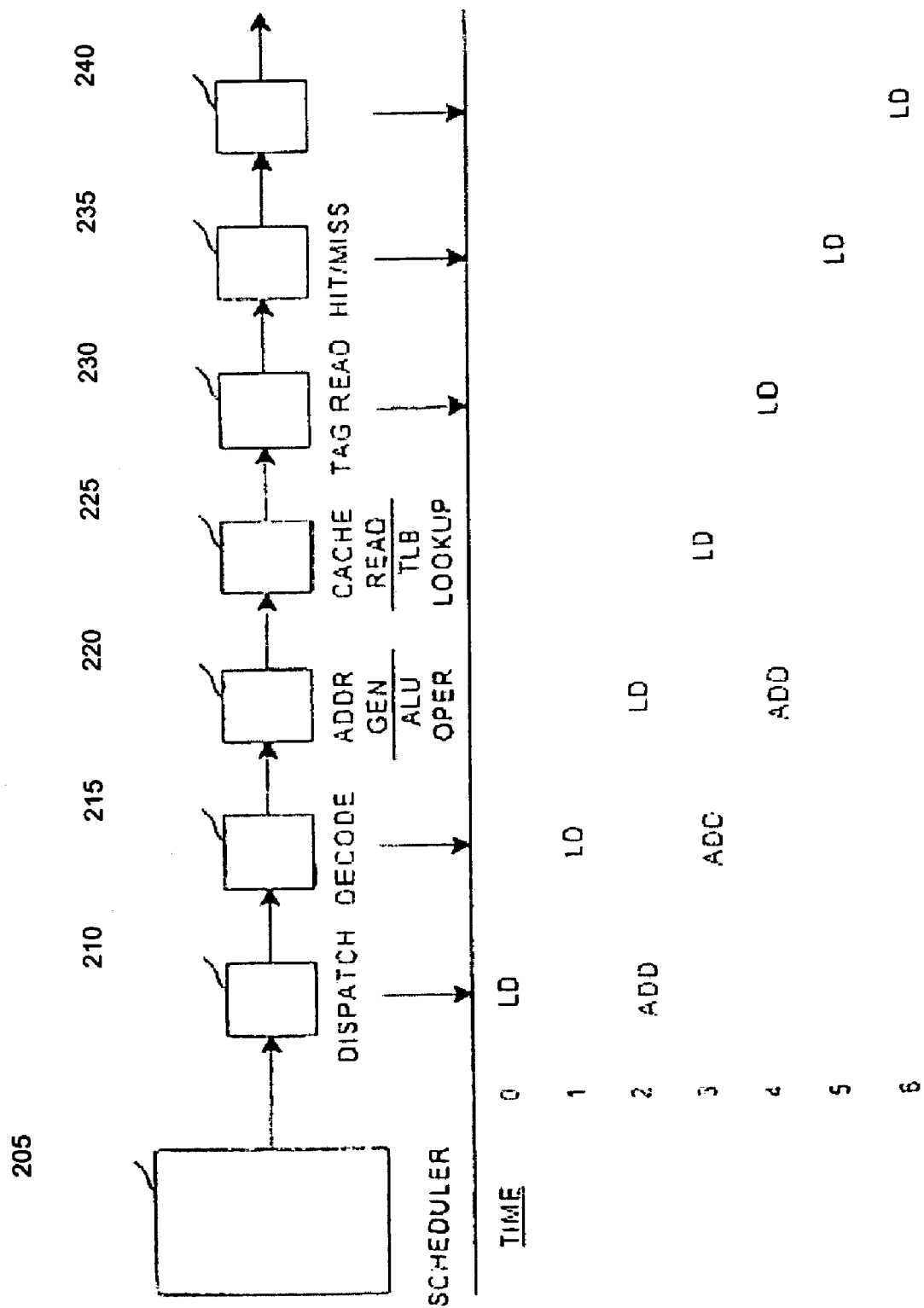
FIG. 2 is a block diagram of a processor pipeline and timing diagram in accordance with one embodiment of the present invention.

FIG. 2 is a block diagram of a processor pipeline and timing diagram in accordance with one embodiment of the present invention. In FIG. 2, a scheduler 205 schedules instructions to pipeline stages 210, 215, 220, 225, 230, 235 and 240, which are identical in function to the stages shown in FIG. 1. The timing diagram of FIG. 2 illustrates a two-cycle Ld followed by a one-cycle Add. Scheduler 205 speculatively schedules Add without waiting for a hit/miss signal from Ld. Therefore, Add is scheduled at time=2, so that a two stage distance form Ld is maintained because Ld is a two-cycle instruction. Add is eventually executed at time=4 when it arrives at stage 220, which is one cycle after Ld performs the cache read at stage 225.

By speculatively scheduling Add, scheduler 205 assumes that Ld will execute correctly (i.e., the correct data will be read from the cache at stage 18). A comparison of FIG. 2 with FIG. 1 illustrates the advantages of speculatively scheduling Add. Specifically, in FIG. 1, the Add instruction was not scheduled until time=6, thus Ld had a latency of six. In constrast, in FIG. 2 the Add instruction was scheduled at time=2, thus Ld had a latency of only two, or four less than the Ld in FIG. 1. Further, scheduler 205 in FIG. 2 has slots available to schedule additional instructions at time=3 through time=6, while scheduler 10 in FIG. 1 was able to only schedule one add instruction by time=6. Therefore, the present invention, by speculatively scheduling, reduces the latency of instructions and is able to schedule and process more instructions than the prior art.

However, embodiments of the present invention account for the situation when an instruction is speculatively scheduled assuming that it will be executed correctly, but eventually is not executed correctly (e.g., in the event of a cache miss). The present invention resolves this problem by having a replay unit. The replay unit replays all instructions that executed incorrectly.

The replay unit is an efficient way to allow the instructions to be executed again. As is known in the art, the instructions remain fixed at the same relative position to the instructions they depend on as created by the scheduler when replayed in the replay loop. However, in embodiments of the present invention, when the instructions are replayed, they are sent to the history-based re-scheduler, where the instructions that are not ready are allowed to be delayed when necessary, increasing the efficiency of instructions output by the scheduler and also increasing the overall performance of the processor.

In practical implementation, the scheduler is a costly resource based on its relative on-die size. Since schedulers are expensive to implement, its overall on-die size should be minimized while its overall efficiency dispatching instructions should be maximized. For example, an instruction that is read from the instruction queue and written into the scheduler will wait in the scheduler until it is ready dispatched. Effectively, an instruction that waits in the scheduler for an extended period of time will waste an entry in the scheduler that could be otherwise used by other instructions in the queue that are already ready for dispatch. In embodiments of the present invention, the history-based re-scheduler analyzes which instructions will be ready for dispatch by the scheduler. Thus, the re-scheduler writes them into the scheduler in an order that decreases the duration the instructions are in the scheduler waiting to be scheduled and increases the efficiency of the scheduler without increasing its one-die size.

Figure 3:
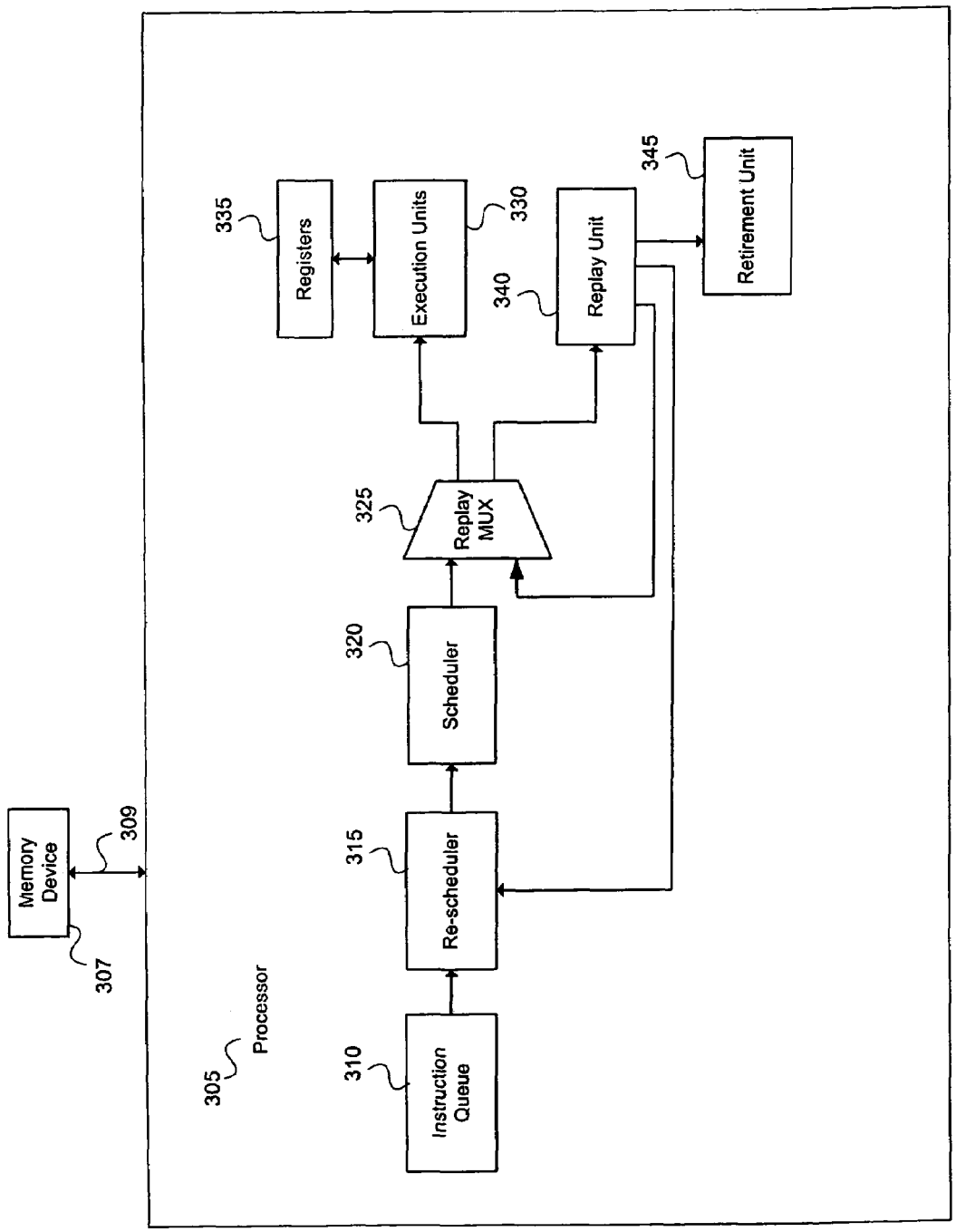
FIG. 3 is a block diagram of a processor in accordance with one embodiment of the present invention.

FIG. 3 is a block diagram of a computer processor in accordance with one embodiment of the present invention. The processor 305 is included in a computer system (now shown). Processor 305 is coupled to other components of the computer, such as a memory device 307 through a system bus 309.

Processor 305 includes an instruction queue 310. Instruction queue 310 feeds instructions into history-based re-scheduler 315. In one embodiment, the instructions are "micro-operations." (also known as "Uops"). Micro-operations are generated by translating complex instructions into simple, fixed length instructions for ease of execution.

History-based re-scheduler analyzes the instructions. Each instruction carries additional information with it that specifies how long it is likely to wait in the scheduler before scheduling based on previous dispatches and executions of the instruction. The information is used to delay writing in the scheduler those instructions that are likely to wait for at least a few clock cycles when there are instructions in line behind those that can be written to the scheduler and dispatched immediately. Scheduler 320 dispatches an instruction received from re-scheduler 315 when the resources are available to execute the instruction and when sources needed by the instruction are indicated to be ready.

Scheduler 320 speculatively schedules instructions because the instructions are scheduled when a source is indicated to be ready. Scheduler 320 outputs the instructions to a replay multiplexer ("MUX") 325. The output of replay MUX 325 is coupled to an execution unit 330. Execution unit 330 executes received instructions. Execution unit 330 can be an arithmetic logic unit ("ALU"), a floating point unit, a memory unit, etc. Execution unit 330 is coupled to registers 335 which are the registers of processor 305. Execution unit 330 loads and stores data in registers 335 when executing instructions.

Processor 305 further includes a replay unit 340. Replay unit 340 replays instructions that were not executed correctly after they were scheduled by scheduler 320. Replay unit 340, like execution unit 330, receives instructions output from replay MUX 325. Instructions are staged through replay unit 340 in parallel to being staged through execution unit 330. The number of stages varies depending on the amount of staging desired in each execution channel.

If the instruction has executed correctly, instruction is declared "replay safe" and is forwarded to a retirement unit 345 where it is retired. Retiring instructions is beneficial to processor 305 because it frees up processor resources and allows additional instructions to start execution. If the instruction has not executed correctly, replay unit 340 replays or re-executes the instruction by sending the instruction to re-scheduler 315. In the alternative, replay unit 340 may send the instructions to replay MUX 325.

An instruction may execute incorrectly for many reasons. The most common reasons are a source dependency or an external replay condition. A source dependency can occur when an instruction source is dependent on the result of another instruction. Examples of an external replay condition include a cache miss, incorrect forwarding of data (e.g., from a store buffer to a load), hidden memory dependencies, a write back conflict, an unknown data/address, and serializing instructions.

Replay unit 340 may determine that an instruction should be replayed based on an external signal (not shown). Execution unit 330 sends a replay signal to replay unit 340. The replay signal indicates whether an instruction has executed correctly or not. If the instruction has not executed correctly, the instruction can be sent to re-scheduler 315 and written into scheduler 320 again for efficient dispatch to execution units 330.

In one embodiment, processor 305 is a multi-channel processor. Each channel includes all of the components shown in FIG. 3. However, the execution unit 330 for each channel will differ. For example, execution unit 330 for one channel will be a memory unit, execution unit 330 for another channel will be an arithmetic unit, etc. Each channel includes its own replay unit 340.

In one embodiment, processor 305 is a multi-threaded processor. In this embodiment, replay unit 340 causes some of the threads to be retired while others are replayed. Therefore, replay unit 340 allows execution unit 305 to be more efficiently used by many threads.

Figure 4:
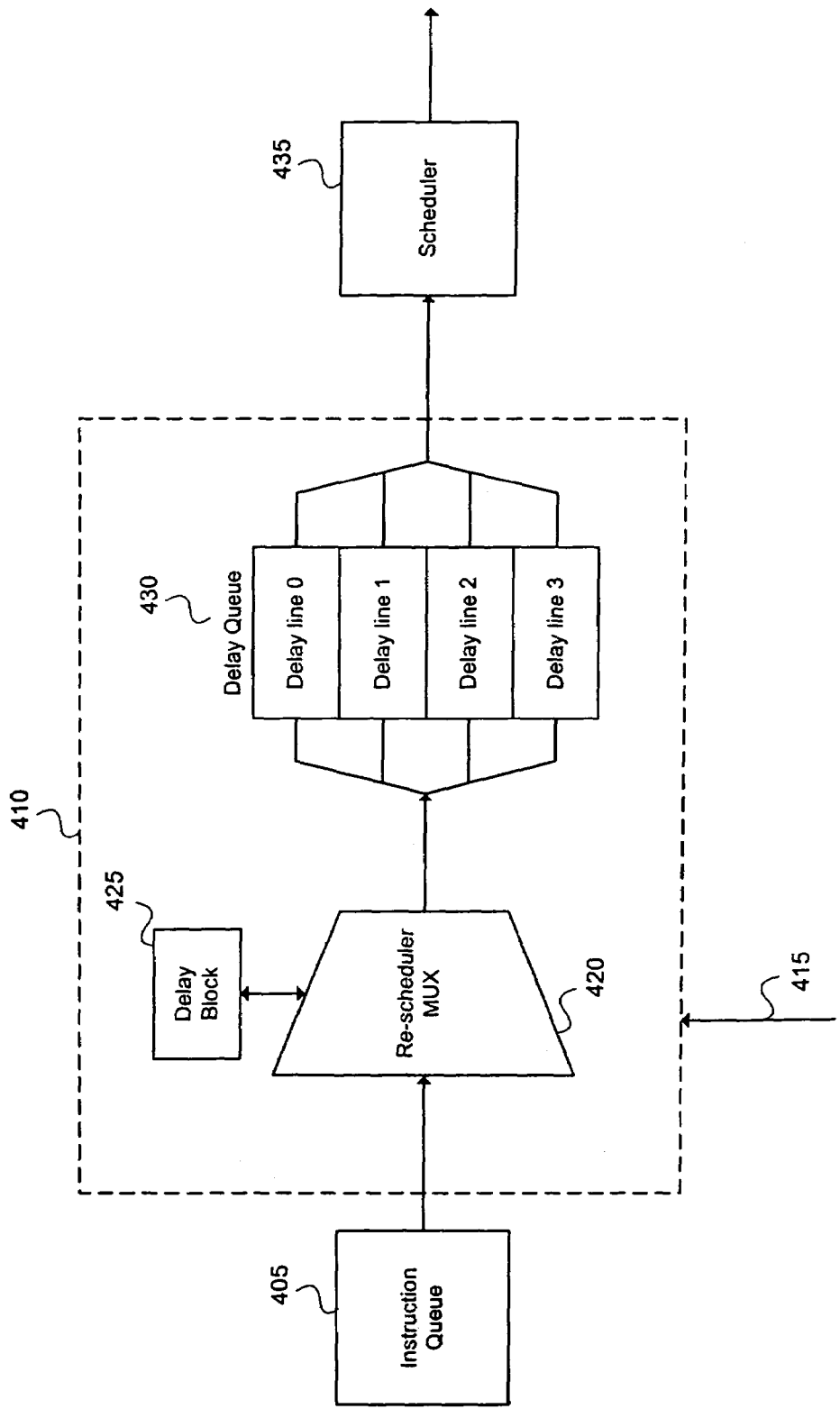
FIG. 4 is a block diagram of a history-based re-scheduler in accordance with one embodiment of the present invention.

FIG. 4 is a block diagram of a history-based re-scheduler in accordance with one embodiment of the present invention. The instruction queue 405 is coupled to history-based re-scheduler 410. Instruction queue 405 forwards instructions into re-scheduler 410. Functionally, re-scheduler 410 acts as a sorter, by sorting out the instructions by the number of clock cycles to delay each instruction. Re-scheduler 410 also receives instructions 415 from replay unit (not shown).

Re-scheduler 410 includes a re-scheduler multiplexer 420. Re-scheduler MUX 420 analyzes multiple instructions from instruction queue 405. The re-scheduler MUX 420 sorts the instructions so that those instructions that are specified to sit scheduler 435 for the shortest amount of time are written into scheduler 435 before other instructions, thereby enabling greater scheduler performance and overall processor efficiency.

In one embodiment of the invention, re-scheduler MUX 425 is coupled to a delay block 425 which stores information for each instruction. Delay block 425 keeps information on the latency of each instructions and a history of how long each instruction waits in the scheduler before it is dispatched. The information is delay block 425 relating to the latency and "block-cycle wait" history is first written during scheduling and is updated every time the instruction is executed.

In one embodiment in accordance with the present invention, a history-based prediction scheme may be utilized where delay block 425 records the previous execution outcome of an instruction. For example, delay block 425 records how many clock cycles an instruction waits in scheduler 435, how long its takes to execute, and accounts for any resource conflicts that may increase the time to complete execution of the instruction. In FIG. 4, as shown, re-scheduler MUX 420 uses the information from delay block 425 to implement "delay lines" within delay queue 430 where instructions with a higher range of values in the wait field are delayed for a fixed number of clocks before they are written into the scheduler. Those instructions with a lower range of values in the wait field are delayed for a smaller fixed number of clocks before they are written into the scheduler. For example, delay line "0" may indicate that the instructions in this line should be written into the scheduler 435 immediately, whereas those sorted into delay line "3" should wait three clock cycles before being written to the scheduler 435.

In this embodiment of the invention, delay queue 430 includes delay line 0 through delay line 3. However, the number of delay lines in delay queue 430 may vary. The number of fixed clock cycles for each delay line may vary, as well. In this manner, re-scheduler MUX 420 can sort out various instructions, by placing them into individual "delay lines," and writing them into the scheduler after the fixed number of clocks have past. Thus, the scheduler is not clogged by instructions that cannot schedule with only a short delay, thereby resulting in a more efficient scheduler.

In one embodiment, the delay block 425 can predict the wait times based on a general prediction scheme. For example, when looking at the relative program position of two instructions, the latency of the first instruction may predict the wait time for a second dependent instruction. If they are close together in the program, but the first instruction has a long latency, then delay block 425 will predict that the second instruction should have a wait time at least the length of the latency of the first instruction. Other types of predictions schemes can also be implemented based on the type of instructions executed by the program.

Figure 5:
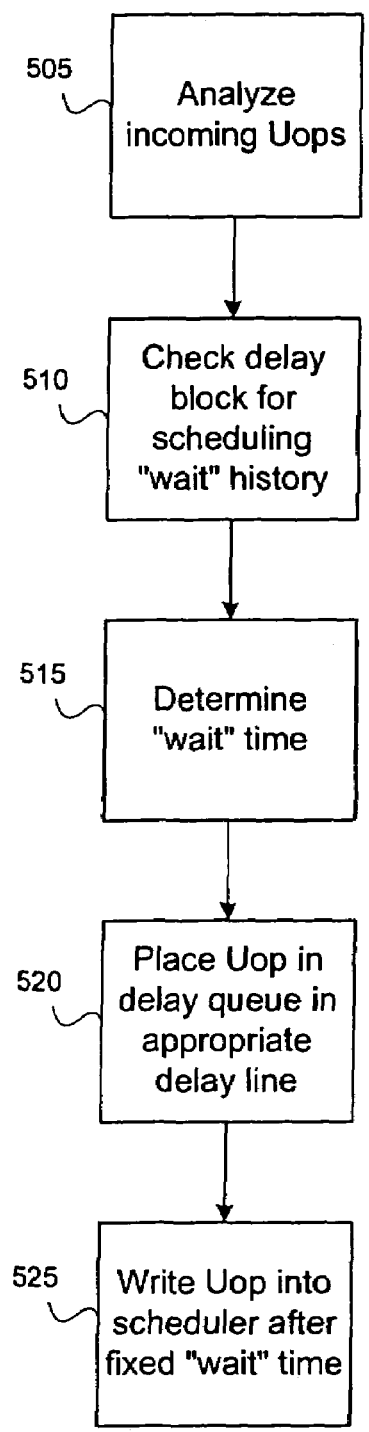
FIG. 5 is a flow diagram of the operation of a history-based re-scheduler in accordance with one embodiment of the present invention.

FIG. 5 is a flow diagram of the history-based re-scheduler in accordance with one embodiment of the present invention. FIG. 5 illustrates the operation of the re-scheduler 410 according to one embodiment of the present invention. In block 505, the re-scheduler 410 analyzes incoming Uops from the instruction queue 405 or the replay unit, and control is then forwarded to block 510. In block 510, re-scheduler MUX 420 checks delay block 425 for latency and scheduling history information for each Uops being analyzed. Re-scheduling MUX 420 then determines, utilizing the scheduling history from delay block 425, the "wait" time for each Uop in block 515. Control passes to block 520, and re-scheduler MUX 420 places the Uops in the delay queue 430, and more specifically, determines the optimal delay line for each Uop based on the value of the "wait" time and range of "wait" values for the delay lines. In block 525, delay queue 430 writes the Uops from each delay line after the fixed clock cycles have passed. Thereby, re-scheduler 410 increases the overall efficiency of the processor by decreasing the latency of scheduler dispatches into execution.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A re-scheduling system comprising:
   a re-scheduler device coupled to an instruction queue to receive an instruction, before the instruction being first sent to a scheduler;
   a delay unit coupled to said re-scheduler device to store a wait history for said instruction; and
   a delay queue coupled to an output of said re-scheduler device to hold said instruction for a delay period prior to writing said instruction into the scheduler, the delay independent of the current availability of input data to the instruction.

2. The system of claim 1 wherein said delay queue comprises:
   said at least one delay line, wherein each of said at least one delay lines to hold said instruction for a fixed number of clock cycles.

3. The system of claim 2 wherein said re-scheduler device is to sort said instruction into at least one delay line based on said wait history for said instruction.

4. The system of claim 1 wherein said delay unit is to store wait history information for said instruction when said instruction is first scheduled, and is to update wait history information for said instruction when said instruction is executed.

5. The system of claim 1 wherein said delay unit is to store latency information for said instruction when said instruction is first scheduled, and is to update latency information for said instruction when said instruction is executed.

6. The system of claim 1 wherein said delay unit is to store resource conflicts for said instruction when said instruction encounters a resource conflict during execution.

7. The system of claim 2 wherein said delay block utilizes a general prediction scheme to determine a number of clock cycles to store as said wait history.

8. The system of claim 7 wherein said re-scheduler device sorts said instruction based on said wait history for said instruction.

9. A computer processing system comprising:
a memory device to store instructions;
a processor coupled to said memory device and to execute said instructions, said processor including:
a re-scheduler having a first input coupled to an instruction queue, a second input coupled to a replay unit, and an output;
a scheduler coupled to said re-scheduler output;
a replay system having a first and second outputs, said first output coupled to an execution unit and second output coupled to said re-scheduler;
wherein said re-scheduler comprises:
a re-scheduler device coupled to an instruction queue to receive an instruction, before the instruction being first sent to the scheduler;
a delay unit coupled to said re-scheduler device to store wait history for said instruction; and
a delay queue coupled to the output of said re-scheduler device to hold said instruction for a fixed number of clock cycles, the fixed number of cycles independent of the current availability of input data to the instruction.

10. The system of claim 9 wherein said delay queue comprises:
said at least one delay line, wherein each of said at least one delay line holds said instruction for a fixed number of clock cycles.

11. The system of claim 10 wherein said re-scheduler device is to sort said instruction into at least one delay line based on said wait history for said instruction.

12. The system of claim 9 wherein said delay unit is to store wait history information for said instruction when said instruction is first scheduled, and is to update wait history information for said instruction when said instruction is executed.

13. The system of claim 9 wherein said delay unit is to store latency information for said instruction when said instruction is first scheduled, and is to update latency information for said instruction when said instruction is executed.

14. The system of claim 9 wherein said delay unit is to store resource conflicts for said instruction when said instruction encounters a resource conflict during execution.

15. The system of claim 10 wherein said delay unit utilizes a general prediction scheme to determine a number of clock cycles to store as said wait history.

16. The system of claim 15 wherein said re-scheduler device is to sort said instruction based on said wait history for said instruction.

17. A method of processing a computer instruction in a replay loop comprising:
receiving an instruction output from an instruction queue, before the instruction being first sent to a scheduler;
checking a delay unit for a scheduling history for said instruction;
determining a wait time for said instruction;
placing said instruction in a delay queue, wherein said delay queue includes at least one delay line with a fixed wait time; and
writing said instruction to said scheduler after said fixed wait time, the fixed wait time independent of the current availability of input data to the instruction.

18. The method of claim 17 wherein determining a wait time for said instruction is based on said scheduling history stored in said delay unit.

19. The method of claim 18 wherein placing said instruction in a delay queue comprises:
matching said wait time for said instruction to the closest said fixed wait time for said at least one delay time.

20. The method of claim 17 wherein said scheduling history is determined by a general prediction scheme.

21. A set of instructions residing in a computer readable storage medium, said set of instructions capable of being executed by a processor to implement a method of processing a computer instruction in a replay loop comprising:
receiving an instruction output from an instruction queue, before the instruction being first sent to a scheduler;
checking a delay unit for a scheduling history for said instruction;
determining a wait time for said instruction;
placing said instruction in a delay queue, wherein said delay queue includes at least one delay line with a fixed wait time; and
writing said instruction to said scheduler after said fixed wait time, the fixed wait time independent of the current availability of input data to the instruction.

22. The set of instructions of claim 21 wherein determining a wait time for said instruction is based on said scheduling history stored in said delay unit.

23. The set of instructions of claim 22 wherein placing said instruction in a delay queue comprises:
matching said wait time for said instruction to the closest said fixed wait time for said at least one delay line.

24. The set of instructions of claim 21 wherein said scheduling history is determined by a general prediction scheme.

* * * * *

UNITED STATES PATENT AND TRADEMARK OFFICE
CERTIFICATE OF CORRECTION

PATENT NO. : 7,502,912 B2 Page 1 of 1
APPLICATION NO. : 10/749272
DATED : March 10, 2009
INVENTOR(S) : Avinash Sodani et al.

It is certified that error appears in the above-identified patent and that said Letters Patent is hereby corrected as shown below:

| Column | Line | |
|---|---|---|
| 6 | 50-51 | After "the delay" insert --.--. |

Signed and Sealed this

Twenty-fifth Day of May, 2010

David J. Kappos
*Director of the United States Patent and Trademark Office*